May 12, 1953  E. A. WEINBERG  2,638,368
FRANGIBLE CONNECTION
Filed Jan. 17, 1946

INVENTOR.
Edwin A. Weinberg
BY
ATTORNEY

Patented May 12, 1953

2,638,368

UNITED STATES PATENT OFFICE 2,638,368

FRANGIBLE CONNECTION

Edwin A. Weinberg, Troy, N. Y., assignor to The Ludlow Valve Manufacturing Co., Inc., Troy, N. Y., a corporation of New York Application January 17, 1946, Serial No. 641,684

5 Claims. (Cl. 287—129)

My invention relates to frangible connections and particularly to frangible bolts adapted to connect fire hydrants, street light standards and other structures, which rise above the ground, to a foundation or other structure which is rigidly fixed at or below the surface of the ground. Such structures are generally located at the side of a street or highway where they are exposed to the hazards of passing traffic, and automobiles or other vehicles frequently collide therewith causing serious damage. Fire hydrants and the like are usually made of cast iron and the impact of a colliding vehicle often cracks or breaks the metal to such an extent that replacement of the entire structure is necessary.

The principal object of my invention is to provide a frangible bolt which, when used to connect two flanged elements together, will safeguard the other more expensive parts of the assembly by breaking under impact before damage is done to the rest of the structure. Another object is to provide a bolt of this character which may be substituted for the present bolts in existing hydrants or other structures whereby they are safeguarded against damage without the necessity of revising the design or replacing any parts except the special frangible bolts.

With these objects in view, my invention resides in the novel elements and the combination of elements described below and illustrated in the accompanying drawings in which—

Figure 2:
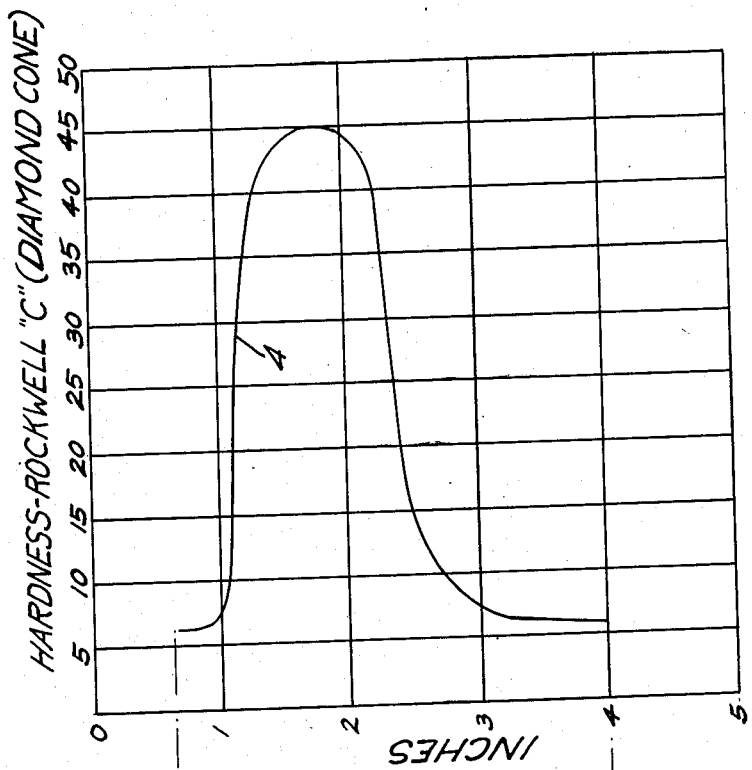
Fig. 2 is a graph showing how hardness of the bolt varies in different sections thereof.

It is well known in the metallurgical art that when a heat hardenable material, such as a carbon steel, is hardened by heating and quenching, the tensile strength is increased but the material becomes harder and more brittle; the hardness increasing and the impact strength decreasing as the carbon content of the steel increases.

In order to produce a frangible bolt with the desired characteristics a differential type of hardening must be employed because different degrees of hardness or ductility are desired in different portions of the bolt. Thus, the head of the bolt and the threaded portion thereof which engages the nut are subjected to torsional stresses due to the tightening of the nut when the connection is made. Furthermore, it is desirable that the bolt be able to yield slightly without breaking in order to insure against fracture by minor shocks. On the other hand, that portion of the bolt in the zones thereof which are immediately adjacent the faces of the connected flanges must be hard and substantially more brittle than those portions of the bolt adjacent the ends thereof so that this portion or section of the bolt is rendered vulnerable to impact. In other words, the head and threaded section of the bolt should be maintained soft and comparatively ductile while the central portion thereof between the head and threaded portions should be hard and comparatively brittle. Thus, in tension, the bolt will possess substantially the same strength as an ordinary bolt so that it will be capable of withstanding the tensile and torsional stresses developed therein in connecting up the joint; the comparatively soft head and the comparatively soft threaded section will be capable of withstanding the wrench torque in bolting up the assembly; and, in the case of a hydrant barrel, the bolts will be capable of taking the full hydrostatic load to which the hydrant may be subjected. However, in the case of severe impact, such as would result from a heavy vehicle colliding therewith, the shearing and bending stresses to which the bolt will be subjected would cause the hardened section thereof to break, thus releasing the bolted connection before any severe damage can be done to the connected parts.

Differential hardening of a bolt in order to produce the characteristics described above may be effected in a number of different ways. For example, the central section of the bolt may be heated by inducing high frequency electric currents therein, by flame heating or by resistance heating, while the end sections of the bolt are maintained at a comparatively low temperature by water, Dry Ice or any other suitable cooling medium.

After the central section of the bolt has thus been heated to a temperature within the austenitic range, it is quickly cooled, as by quenching in water, so that the central portion thereof becomes hard and brittle.

Referring to the drawings—

Figure 1:
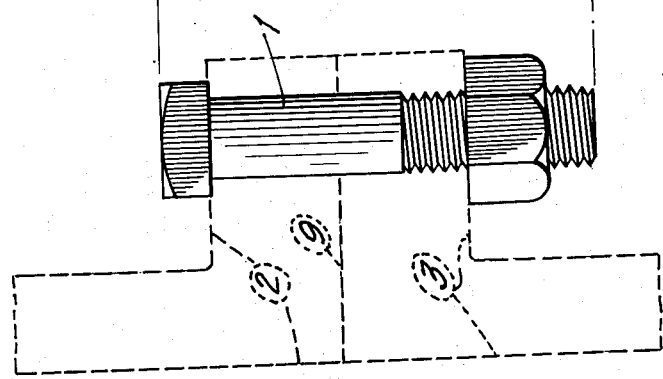
Fig. 1 is an elevation view of my bolt.

Fig. 1 shows a typical bolt 1 embodying my invention; the dotted outlines 2 and 3 representing fragmentary portions of two flanges connected by the bolt 1. In the graph of Fig. 2, in which the ordinates are inches of bolt length, and the abscissas are the Rockwell "C" hardness (diamond cone), the curve 4 shows how the hardness of a ⅝" diameter bolt formed of S. A. E.

1040 steel varies in hardness between the extremities thereof.

Figure 3:
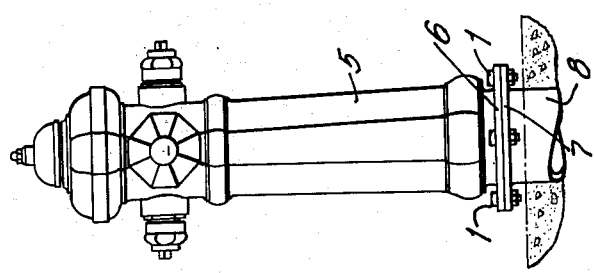
Fig. 3 is an elevation view of a fire hydrant showing how my bolts are used to connect the flanged base of the hydrant to a flanged water supply pipe.

In Fig. 3, 5 is a fire hydrant having a flange 6 on the bottom thereof which is connected to the flange 7 on the pipe 8 by means of a plurality of my bolts 1.

It will be apparent from Fig. 2 that the bolt shown in Fig. 1 has comparatively soft head and threaded portions and that the hardness increases abruptly from the zones adjacent the head and threaded portions to a maximum in that portion of the bolt which is adjacent the plane 9 of the flanges 2 and 3 shown in Fig. 1.

Instead of forming the bolt from a material such as steel which initially contains carbon in a quantity sufficient to make it hardenable by an appropriate heat treatment, it is possible, particularly in the case of bolts of small diameter, to attain the advantages of my invention by forming them of a material which can be hardened by heat treatment of a different type than by heating and quenching. Thus, by case hardening or carburizing, it is possible substantially to harden the outer portions of the bolt to a substantial depth which will make it more brittle in the case hardened zone. Hence, the terms "heat hardenable metal" and "metal adapted to be hardened by heat treatment," as used above and in the following claims, is to be understood as embracing any metal capable of being hardened by any type of heat treatment.

While I have described and illustrated my invention in connection with a headed bolt, it is obvious that the invention applies as well to a stud bolt having a nut at each end; and therefore the term "bolt" is to be understood as including all kinds of bolts.

What I claim is:

1. A frangible connection comprising a pair of plane faced flanges disposed in face-to-face relation, and a bolt extending through said flanges and securing the same together; said bolt being an integral structure of the same material and of uniform cross-sectional area throughout its shank formed of heat hardenable metal and being substantially harder and more brittle throughout the zones thereof immediately adjacent the faces of said flanges than in the zones adjacent the ends of said bolt; whereby said bolt will break in a zone adjacent the faces of said flanges when said connection is subjected to severe shock tending to shear said bolt.

2. A bolt formed of heat hardenable metal and comprising a head at one end, a threaded portion adjacent the other end adapted to receive a nut, and a comparatively short section intermediate the head and said threaded portion characterized by an abrupt increase in hardness and being substantially harder and substantially more brittle than the end portions of said bolt; said bolt being an integral structure of the same material and of uniform cross-sectional area throughout its shank whereby, to provide a frangible section in said bolt which will be vulnerable to shock tending to shear said bolt, without materially reducing the resistance of said bolt to tensile stress.

3. A frangible connection comprising a pair of plane-faced flanges disposed in face-to-face relation, and a bolt of integral structure of uniform cross-sectional area and composed of the same material throughout its shank extending through said flanges and securing the same together; said bolt comprising a head at one end, and a threaded portion adjacent the other end adapted to receive a nut, the hardness of said bolt increasing substantially and abruptly in a zone thereof intermediate said head and said threaded portion and having substantially less resistance to breakage in said zone when subjected to shearing shock than in the end zones thereof.

4. A bolt adapted to connect together two plane-faced flanges in face-to-face relation, said bolt being of integral structure of the same material and of uniform cross-sectional area throughout its shank, and a comparatively short intermediate frangible section comprising a zone adjacent said plane-faced flanges, where they are in face-to-face relation, being characterized by an abrupt increase in hardness and being substantially harder and more brittle than the end portions of said bolt in order that said frangible section will be vulnerable to shock thereby tending to shear said bolt without materially reducing the resistance thereof to tensile stress.

5. A bolt as defined in claim 4, and further characterized in that said frangible section has a Rockwell "C" hardness falling within a range of 5 to 45.

EDWIN A. WEINBERG.

References Cited in the file of this patent

UNITED STATES PATENTS

| Number | Name | Date |
|---|---|---|
| 602,378 | Thomson | Apr. 12, 1898 |
| 1,669,700 | Egbert | May 15, 1928 |
| 1,767,653 | Davis | June 24, 1930 |
| 2,325,079 | Soderholm | July 27, 1943 |
| 2,411,862 | Arnold | Dec. 13, 1946 |